June 24, 1947. D. D. ADAMS ET AL 2,422,998
METHOD OF MAKING LAMINATED CORRUGATED ARTICLES
Filed July 31, 1945 2 Sheets-Sheet 1

Inventors
Douglas D. Adams
and Karl Rollius
Frease and Bishop Attorneys

June 24, 1947. D. D. ADAMS ET AL 2,422,998
METHOD OF MAKING LAMINATED CORRUGATED ARTICLES
Filed July 31, 1945 2 Sheets-Sheet 2
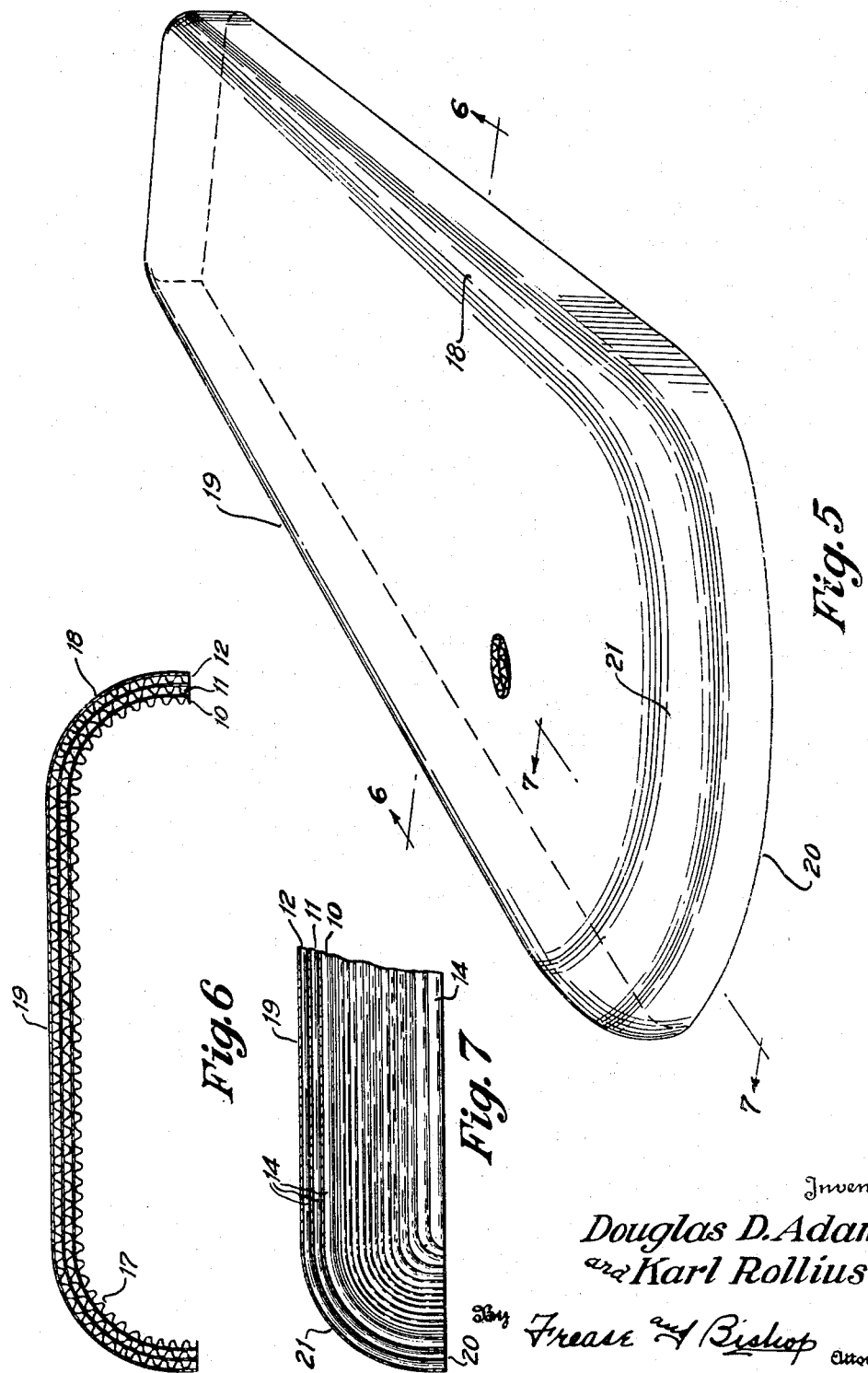
Inventors
Douglas D. Adams
and Karl Rollius
By Frease and Bishop
Attorneys Patented June 24, 1947

2,422,998

UNITED STATES PATENT OFFICE 2,422,998

METHOD OF MAKING LAMINATED CORRUGATED ARTICLES

Douglas D. Adams and Karl Rollius, Canton, Ohio, assignors to Old King Cole, Incorporated, Canton, Ohio, a corporation of Ohio Application July 31, 1945, Serial No. 608,028

2 Claims. (Cl. 154—110)

The invention relates generally to making shaped laminated articles, and more particularly to laminated corrugated paper articles having a variety of curved or irregular shapes, and to a method of making such articles.

It is very desirable, in forms or mandrels employed for making shaped articles of plastic materials, to use corrugated fiber or paper board because it is relatively cheap and light in weight, and thus provides extremely low manufacturing and shipping and handling costs.

However, such forms or mandrels frequently are required to have a variety of irregular shapes, when used for making molded rubber articles, for example; and the type of standard corrugated paper board, which is strong enough to maintain its shape under compression, cannot be bent or curved to produce the required irregular contours.

Corrugated paper board is made in several standard types, including so-called single face, single wall and double wall material. The single face material consists of a flat sheet or liner glued to a corrugated sheet. This material is easily bent or curved, but does not have sufficient strength to provide a stiff wall which will hold its shape in a form.

Standard single wall corrugated board consists of a corrugated sheet with a liner glued on each side thereof. Standard double wall corrugated board consists of three liners alternatively arranged with two corrugated sheets, and is therefore equivalent to one ply of single wall added to one ply of single face. Both the standard single and double wall corrugated board are relatively stiff and sufficiently strong and self-sustaining to maintain their shape under a substantial amount of load, but they cannot be shaped or curved to any extent without breaking the liners and thus weakening the board.

Accordingly, in making paper forms or mandrels for molding irregular rubber articles such as bullet-proof fuel tanks for air planes, it was believed necessary, prior to the present invention, to use a molded paper form such as papier-mâché for these irregular shapes, and such papier-mâché forms were relatively expensive and heavy.

It is an object of the present invention to provide an improved rigid laminated paper article having bent or curved contours and constructed of standard corrugated paper board.

Another object is to provide an improved method of making a laminated shaped corrugated paper article out of standard corrugated paper board, said article having relatively high strength and rigidity.

A further object is to provide a rigid paper form or mandrel having curved contours and constructed of a plurality of layers of standard single face corrugated paper.

Another object is to provide an improved method of constructing a rigid shaped paper form of a plurality of layers of a standard single face corrugated paper.

Another object is to provide an improved method of making a shaped laminated corrugated paper article, having certain curves formed along the corrugations and other curves formed transversely of the corrugations.

A still further object is to provide an improved method of making a shaped laminated corrugated paper article, whereby a self-sustaining form or mandrel of any desired shape or contour can be produced, and the walls of said form will have sufficient strength to maintain their shape during handling or while molding plastic material around said form.

Finally, it is an object of the present invention to provide a simple and inexpensive method of making a shaped laminated form or article from standard corrugated paper board, which method overcomes the disadvantages of prior methods and which article overcomes the disadvantages of prior constructions.

These and other objects, which will be apparent to those skilled in the art from the following description, are accomplished by the parts, elements, devices, constructions, arrangements, combinations, methods and steps which comprise the present invention, the nature of which is set forth in the following general statements, preferred embodiments of which are set forth in the following description and illustrated in the accompanying drawings, and which is particularly and distinctly pointed out and set forth in the appended claims forming part hereof.

In general terms, the nature of the improved method may be stated as including the steps of cutting at least two substantially identical pieces of paper, at least one of which is single face corrugated paper, according to a configuration which will form the desired shaped article, applying a coating of plastic adhesive to the outer ridges of the intermediate corrugations, superposing the pieces with the corrugations of one abutting the liner of another, pressing said abutting pieces between dies having the outer and inner contours of the finished article to shape said pieces by slippage of one upon another, and holding said pieces in said shape until the plastic adhesive is set.

The nature of the improved shaped article made by the present improved method may be stated in general terms as including a shaped paper form or article having walls constructed of at least two laminations of paper, at least one of which is single face corrugated paper, said laminations being joined together with adhesive, and having been shaped while said adhesive is plastic to allow slipping of one lamination upon another.

In the accompanying drawings, preferred embodiments of the invention are shown by way of example.

Fig. 5 is a perspective view showing a shaped laminated corrugated paper form made according to the present improved method and used for molding a rubber fuel tank end cap.

Fig. 6 is a cross sectional view as on line 6—6, Fig. 5; and

Fig. 7 is a fragmentary sectional view as on line 7—7, Fig. 5.

Similar numerals refer to similar parts throughout the several figures of the drawings.

While the present invention is shown by way of example as embodied in a shaped article used as a form or mandrel for molding a rubber product, and in the method of making said article, it is to be understood that, within the scope of the appended claims, the invention may be applied to making shaped laminated corrugated paper articles used as prefabricated concrete forms for producing concrete articles of any desired shape, or to the making of prefabricated insulation layers or wall sections for structures such as buildings, refrigerators or automobiles; wherever the shape of the article is required to be irregular, or curved, or both.

Figure 1:
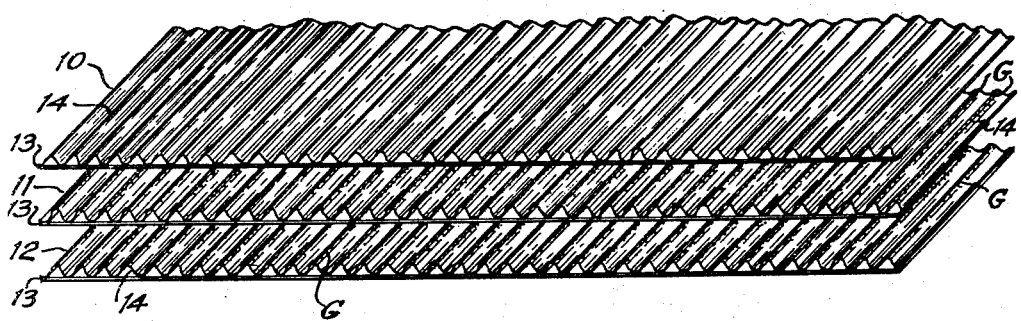
Figure 1 is a fragmentary perspective view of three pieces or laminations of standard single face corrugated paper, shown in position to be placed one upon another after plastic adhesive has been applied to the outer ridges of the corrugations of certain pieces.

Referring to the drawings, in Figure 1 are shown three pieces or laminations 10, 11 and 12 of standard single face corrugated paper, each layer consisting of a flat sheet or liner 13 to which is adhesively secured a corrugated sheet 14. This single face corrugated paper is furnished by the manufacturer with different sizes of corrugations or flutes, called A, B, or C flutes, depending upon the size thereof. Single face corrugated paper comes in large rolls and is easily bent or curved along the corrugations 14.

As shown in Fig. 1, the three layers 10, 11 and 12 are superposed one above another, with their corrugations 14 on the top side and their liners 13 on the bottom side. In making a shaped form or article of ordinary single face corrugated paper, two or three laminations may be used, depending upon the size of the flutes and also upon the size and required strength of the form or mandrel to be made. The first step is to cut or saw several pieces or sheets to provide an equal number of laminations, and the pieces are cut according to a pre-determined configuration or pattern which is designed to produce the finished article formed. For simplicity, the pieces in Figure 1 are shown substantially rectangular.

After the several pieces constituting the laminations or plies of the desired form or mandrel have been cut, the outer surface of the ridges or flutes or corrugations 14 of each of the laminations 11 and 12 are coated with a plastic adhesive indicated at G which may be cold setting or air-hardening glue, and which may require about twenty minutes to set at room temperature. The glue may be applied easily by passing the pieces 11 and 12 between wringer rolls, one of which is coated with the plastic glue. If desired, the glue may be applied to the outer surface of liners 13 instead of to the corrugations 14.

Figure 2:
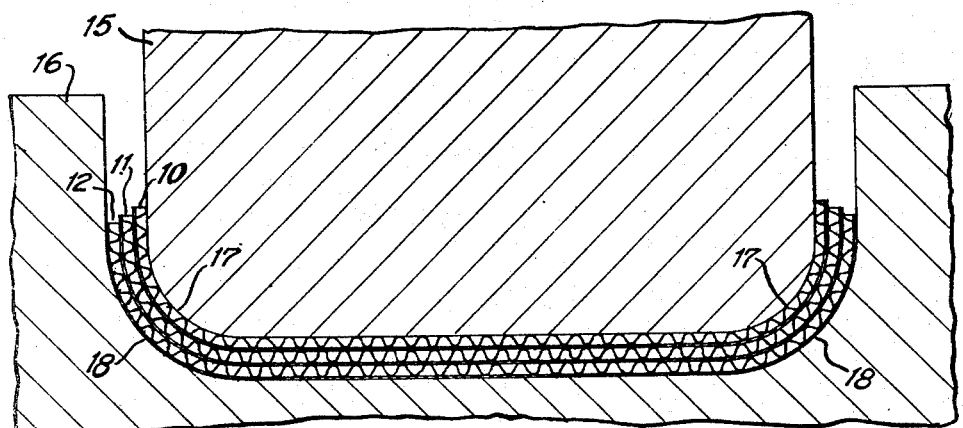
Fig. 2 is a fragmentary sectional view showing the three superposed pieces or laminations being formed into a desired shape between suitable mating dies.

After the laminations are thus coated with glue, they are superposed one on the other and then placed between suitable dies which are shaped to give the desired contour to the laminated article. In Fig. 2 a male die is shown at 15 adapted for fitting within a female die 16, the dies being curved to impart a channel shape to the abutting laminations 10, 11 and 12. Obviously, the superposed laminations 10, 11 and 12 are laid in the die 16 or around the die 15 when the dies are in spaced-apart position, and then the dies are brought together to press and shape the laminations into the desired channel contour. The dies 15 and 16 are brought together while the glue G is still plastic, so that as the laminations are shaped simultaneously around the curved contours 17 and 18 of the dies 15 and 16 respectively, the laminations 10, 11 and 12 can slip laterally one upon the other to conform to the desired bend or contour. In Fig. 2 the slippage or lateral displacement of the layers one upon the other is indicated by the fact that the ends of lamination 10 project above the ends of the middle lamination 11, and the ends of the lamination 11 project above the ends of the outer lamination 12.

By providing for slippage of one lamination upon another, the article can be formed into a desired bend or curved contour such as indicated at 17 and 18 without breaking, cracking or weakening the corrugations 14 or the liners 13 of the separate laminations 10, 11 and 12.

As shown in Fig. 2, the bends or curves 17 and 18 are made along the corrugations, so that the separate laminations 10, 11 and 12 of single face paper are easily bent. After the laminations 10, 11 and 12 have been held by the dies in the position shown in Fig. 2 until the glue G between the laminations has become set, which may be twenty minutes more or less depending upon the type of glue, the dies are pulled apart and the article removed. At this time, the ends 10 and 11 of the laminations may be trimmed even with the ends of lamination 12 to produce a form or mandrel such as shown in cross section in Fig. 6, and the article is rigid and self-sustaining and will bear considerable load, so as to be suitable as a form for molding plastic material such as rubber. The inner corrugated surface may be covered with a liner if desired, in which case glue is applied to the flutes of lamination 10 and the liner superposed thereon before placing the laminations 10, 11 and 12 in the dies 15 and 16.

The form or mandrel which is shown in cross section in Fig. 6 may have a shape or contour such as shown in Fig. 5, which represents an end cap mandrel for molding the ends of a bullet-proof fuel tank for a military airplane. The complete mandrel shown in Figs. 5, 6 and 7 includes a flat bottom wall of preferably double wall corrugated board which closes the bottom side of the form, but such bottom wall is not shown in the drawings, since it forms no part of the present invention.

As shown in Fig. 5, the end cap mandrel 19 has a front end 20 which is laterally rounded and at the same time downwardly curved as indicated at 21. The shaping of the laminations 10, 11 and 12 to form the curved end 20, requires bending or curving the laminations transversely of the corrugations 14, as indicated in Fig. 7. This bending is accomplished in the same manner as the bending along the corrugations, that is, by slipping one lamination on another, except that in making the bends 21, the inner sides of the corrugations 14 become slightly crushed or compressed. As long as the bend is not too sharp, such crushing does not materially weaken the laminated wall.

Figure 3:
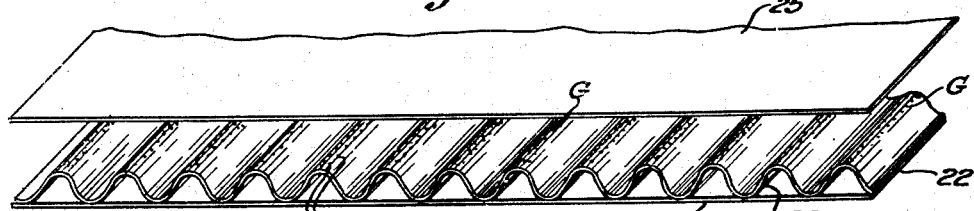
Fig. 3 is a fragmentary view showing a single piece of heavy single face corrugated paper, and a flat sheet or liner in position to be placed thereon, after the outer ridges of the corrugations have been coated with plastic adhesive.
Figure 4:
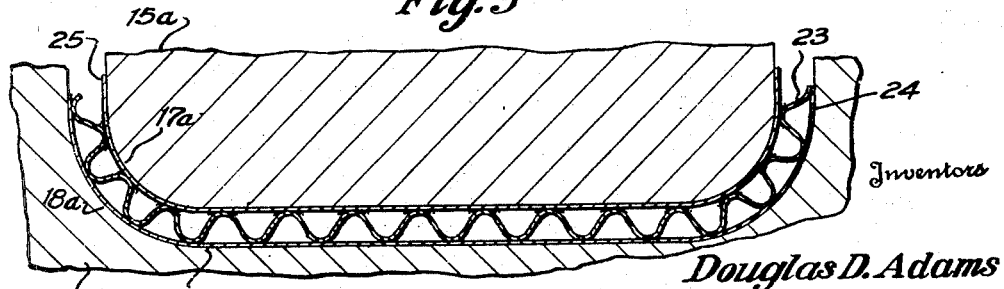
Fig. 4 is a view similar to Fig. 2 showing suitable mating dies forming the corrugated lamination and liner of Fig. 3 into a desired shape.

Referring to Figs. 3 and 4, in certain cases where a heavy single face corrugated paper board is used for making a paper form or mandrel, it may not be necessary to have more than one lamination of corrugated paper. In such case, the heavy single face corrugated board, indicated generally at 22, includes the corrugated sheet or ply 23 and the liner 24 glued thereto, and the outer surfaces of the corrugations 23 are coated with plastic adhesive G and another liner 25 superposed thereon.

When the abutting laminations 22 and 25 are pressed between the dies 15a and 16a, the liner 25 conforms to the curve 17a and the lamination 22 conforms to the curve 18a by reason of the slippage of the liner 25 on the glue coated flutes 23 of the lamination 22. After the glue has set, the shaped article consisting of the lamination 22 of single face corrugated board and the liner 25 is permanently formed and can be removed from the dies.

Accordingly, the number of laminations used may be varied as desired, as long as there are at least two laminations to provide slippage one upon another and at least one of the laminations is single face corrugated paper to provide strength or insulation or both.

The invention is applicable to the manufacture of prefabricated forms of a variety of shapes for making concrete articles such as troughs and small farm buildings, because of the load-bearing strength of the laminated structure; and is also applicable to the making of prefabricated insulation layers or wall sections in various structures because of the insulating property of the paper and the air spaces formed by the corrugations.

Shaped laminated corrugated paper forms or mandrels made according to the present invention can be produced in a great variety of shapes having bends, curves and irregularities; are inexpensive to manufacture and light in weight, with substantial rigidity and load-bearing strength; and are adapted for being made from a plurality of layers of standard single face corrugated paper.

As applied to forms or mandrels for making molded rubber articles, the invention provides a form which is much lighter in weight and less expensive than papier mâché forms; as applied to the making of prefabricated concrete forms the invention provides a structure which is much cheaper and lighter in weight than prior structures; and as applied to prefabricated insulated wall sections, the present invention provides an insulation structure which is cheaper to manufacture and install, and has greater insulating properties than prior structures.

In the foregoing description, certain terms have been used for brevity, clearness and understanding; but no unnecessary limitations are to be implied therefrom beyond the requirements of the prior art, because such words are used for descriptive purposes herein and are intended to be broadly construed. Thus, the term "concrete" as used herein is intended to include concrete, cement or other plastic building material.

Moreover, the embodiments of the improved construction and method illustrated and described herein are by way of example, and the scope of the present invention is not limited to the exact details of construction or of the method.

Having now described the invention, the construction, the operation and use of preferred embodiments thereof, and the advantageous, new and useful results obtained thereby; the new and useful constructions and methods, and reasonable mechanical equivalents thereof obvious to those skilled in the art, are set forth in the appended claims.

We claim:

1. The method of making a shaped laminated paper article including the steps of cutting a plurality of flat plies of paper into a predetermined pattern, at least one of said plies being single face corrugated paper having a liner sheet and a corrugated sheet, applying plastic adhesive to certain surfaces of the plies, superposing said plies with the adhesive coated surfaces abutting each other, die-forming said superposed plies simultaneously into a curved contour of channel cross section by slippage of one ply upon another, said contour having a portion curved transversely of said corrugations, and maintaining said plies in said contour until the plastic adhesive has set.

2. The method of making a shaped laminated paper article including the steps of cutting a plurality of flat plies of corrugated paper into a predetermined pattern, applying plastic adhesive to certain surfaces of the plies, superposing said plies with the adhesive coated surfaces abutting each other, die-forming said superposed plies simultaneously into a channel shaped contour curved transversely of the direction of the corrugations by slippage of the plies one upon another, and maintaining the plies in said contour until the plastic adhesive has set.

DOUGLAS D. ADAMS.
KARL ROLLIUS.

REFERENCES CITED

The following references are of record in the file of this patent:

UNITED STATES PATENTS

| Number | Name | Date |
|---|---|---|
| 1,619,011 | Agar | Mar. 1, 1927 |
| Re. 9,948 | Long | Nov. 29, 1881 |
| 2,335,624 | Weir | Nov. 30, 1943 |
| 2,027,586 | George | Jan. 14, 1936 |
| 1,926,156 | Lormor | Sept. 12, 1933 |
| 1,735,684 | Jurgensen | Nov. 11, 1929 |